APPARATUS FOR THE REMOVAL OF FLASH FROM A WELDED WIRE JOINT

Filed Sept. 12, 1952

Inventors:
Eric Holroyd
Norman Ashcroft Hurst
by Benj. T. Rauber
their attorney 2,730,930
Patented Jan. 17, 1956

2,730,930

APPARATUS FOR THE REMOVAL OF FLASH FROM A WELDED WIRE JOINT

Eric Holroyd, Speke, Liverpool, and Norman Ashcroft Hurst, Liverpool, England, assignors to Dunlop Tire and Rubber Corporation, Buffalo, N. Y., a corporation of New York Application September 12, 1952, Serial No. 309,213

5 Claims. (Cl. 90—15)

Our invention relates to apparatus for mechanically removing flash formed at the joint of a wire loop which has been welded or at similar welded joints.

In the apparatus of our invention two trimming wheels are provided each having a circumferentially extending recess formed at its periphery to receive or accommodate part of the thickness of a wire having a welded joint from which flash is to be removed. The apparatus also comprises means for moving the trimming wheels relatively to the wire so that the recessed portions of the wheels engage the wire in the vicinity of the flash and trim it away. Preferably the trimming wheels are adapted to move initially quickly towards the wire and then more slowly as the flash is cut away.

The trimming wheels may comprise milling cutters or abrading members but a particularly satisfactory form of cutter has teeth with a concave profile, the peripheral portions of the teeth of a pair of cutters meshing when cutting away the flash.

A flash removal unit as described above is particularly suitable for use as a unit in an assembly of the kind described in co-pending application of Crabbe and Holroyd, Ser. No. 309,074, filed September 11, 1952, now Patent No. 2,708,228, dated May 10, 1955, for the automatic, repetitive, production of endless welded wire loops for use in the manufacture of cycle tire bead wires. Such an assembly consists in its essentials of a framework having a wire loop former disposed between two welding heads to each of which welding heads a cut wire loop is delivered alternately and from each of which a welded wire loop can be delivered to an adjacent flash removal unit.

Figure 1:
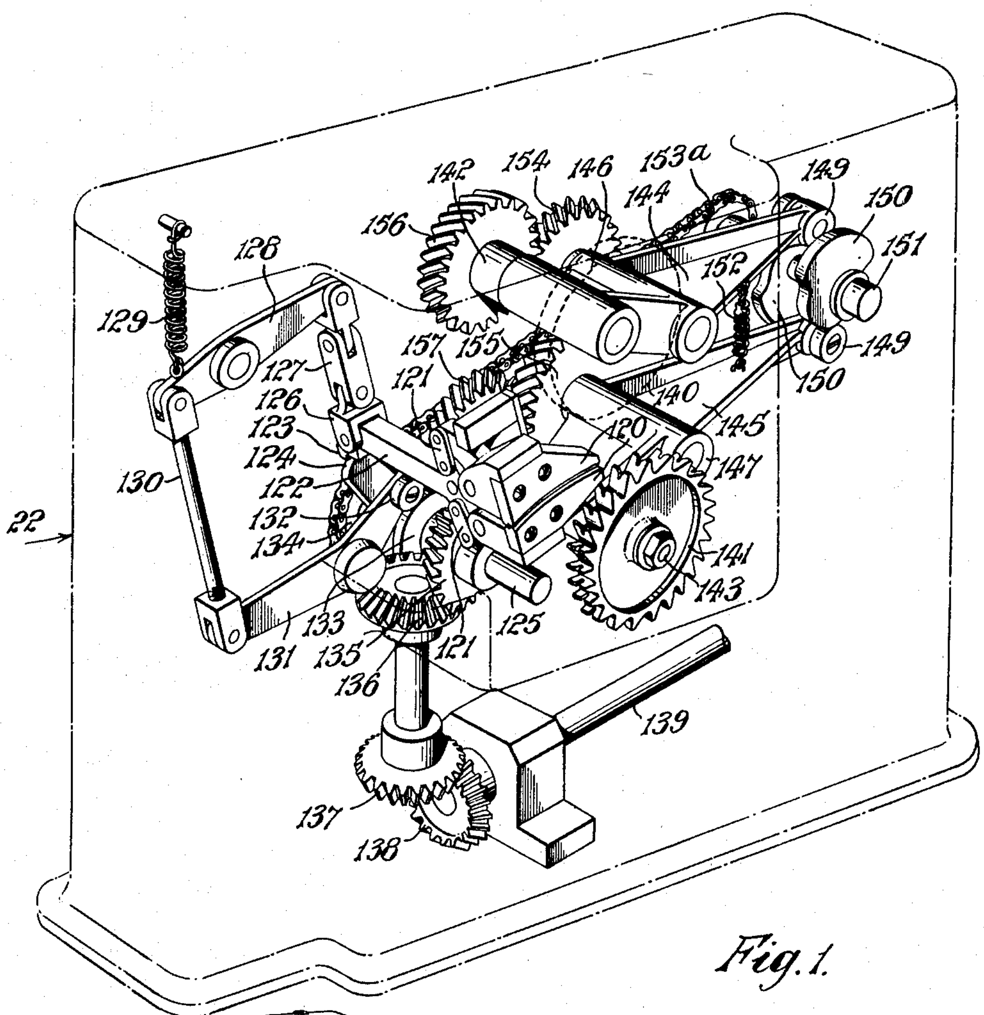
Figure 2:
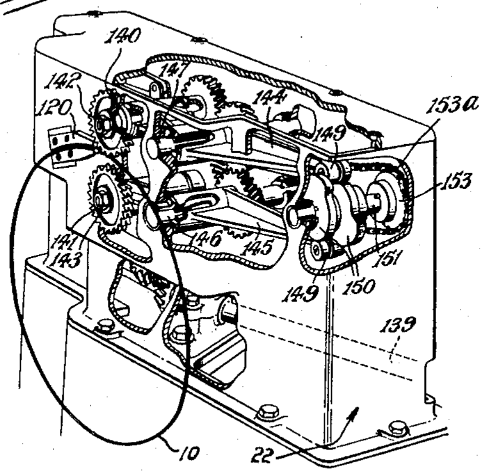

The invention is illustrated by way of example in the accompanying drawings, in which, Fig. 1 is an isometric view of a flash removal machine embodying a preferred form of the invention, and, Fig. 2 is an isometric view of the machine taken from a different angle from that of Fig. 1.

In the embodiment shown in the accompanying drawings, the flash removal head has a pair of receiving jaws 120 operated by a cam operated toggle mechanism to ensure a firm grip of a welded wire loop 10. The toggle mechanism consists of links 121 connecting the pivoted gripping jaws to a toggle lever 122 which has at its other end a roller follower 123 engaging a cam 124 adapted to provide a final squeezing movement to the gripping jaws, said cam being mounted on a cam shaft 125.

The remote end of the toggle lever is also connected by a fork 126 and link 127 to a pivoted arm 128, this arm being anchored by a tension spring 129 to the casing of the flash removal head and also connected by a link 130 to one arm of a lever 131, the other arm of which carries a roller follower 132, which bears against the main closing cam 133 on the cam shaft 125. On the rear end of this cam shaft 125 there is fitted a driving sprocket 134, the shaft 125 being driven through a bevel gear 135 itself driven through bevel gears 137, 138, the latter being driven from shaft 139.

Adjacent to the gripping jaws 120 are two toothed milling cutters 140, 141 which are fixed to spindles 142, 143 free to revolve in the ends of a pair of crank arms 144, 145. These arms are pivotally mounted on spindles 146, 147 the lower spindle 146 being free to revolve and driven by a small, geared motor, not shown. Roller followers 149 at the ends of these arms bear against cams 150 on a cam shaft 151. Spring 152 connected between the arms 144, 145 keeps the followers 149 in contact with the cams 150. Cam shaft 151 carries a sprocket wheel 153 connected by a chain **153*a* to the sprocket wheel 134 on cam shaft 125. Meshing gears 154, 155 are keyed to spindles 146, 147 and these gears in turn mesh with gears 156 and 157 fixed to spindles 142 and 143**.

When a wire loop is inserted in the jaws 120 of the flash removal head, the jaws through the cam 133 close on the wire loop and then through the cam 124 hold it firmly in position whilst the cutters 140, 141, rotating at constant speed, move quickly towards the wire under the action of cams 150 and on reaching the wire move more slowly and cut away the flash. When the cutters reach the wire, the peripheral portions of their respective teeth will mesh with one another. On completion of the cutting operation the cutters move more quickly apart, the jaws open and the wire loop from which the flash has been removed is then removed. In the assembly of units described in co-pending application Ser. No. 309,074, now Patent No. 2,708,228, dated May 10, 1955, the insertion of a welded loop and the removal of a finished wire loop are effected automatically by means of gripping fingers mounted on arms extending radially from a rotatable pillar and adapted to carry a welded loop from the welding unit to the flash removal head and to remove the finished loop from the flash removal head to a delivery station.

Having described our invention, what we claim is:

1. Apparatus for removing the flash from a welded wire joint which comprises a pair of gripping jaws in fixed position, a cam, levers and linkages actuated by said cam to move said jaws together, a second cam acting on said jaws to move said jaws more slowly beyond the movement by said levers and linkages toward gripping position, a pair of trimming wheels each having peripheral cutting teeth and having a circumferential series of recesses in said teeth to receive said wire joint, means to swing said trimming wheels toward each other to engage opposite sides of the flash of the wire joint held in said gripping jaws in the series of recesses in the teeth of opposite trimming wheels and means to drive said trimming wheels to cut said flash from said joint.

2. Apparatus of claim 1 having levers supporting said trimming wheels and a cam to actuate each said lever to move said trimming wheels quickly toward the wire and then more slowly during the cutting of the flash.

3. The apparatus of claim 1 in which the trimming wheels have teeth with a concave profile and in which the wheels are mounted so that peripheral portions of the teeth of a pair of trimming wheels mesh when cutting away the flash.

4. Apparatus for removing the flash from a welded wire joint which comprises a pair of gripping jaws movable to grip said wire near said joint, a pair of trimming wheels movable toward each other to engage the flash of the joint at a fixed distance from said gripping jaws, each of said trimming wheels having a circumferential series of cutting teeth projecting radially and having a recess opening radially inwardly said recesses forming a circumferential path about the respective trimming wheel, means for rotating said wheels and means for moving said wheels toward each other to engage the joint held in said jaws.

5. The apparatus of claim 4 in which said means for moving said wheels toward each other comprises a supporting lever for each wheel and a cam engaging and actuating said lever.

References Cited in the file of this patent

UNITED STATES PATENTS

| | | |
|---|---|---|
| 554,796 | Roberts | Feb. 18, 1896 |
| 574,226 | Smith | Dec. 29, 1896 |
| 1,292,157 | Townsend | Jan. 21, 1919 |
| 1,665,851 | Harris | Apr. 10, 1928 |
| 2,000,239 | Linn | May 7, 1935 |
| 2,035,810 | Hofmann | Mar. 31, 1936 |
| 2,169,824 | Tubbs | Aug. 15, 1939 |
| 2,187,550 | Tow | Jan. 16, 1940 |
| 2,615,371 | See | Oct. 28, 1952 |

FOREIGN PATENTS

| | | |
|---|---|---|
| 15,564 | Great Britain | July 14, 1896 |